US012641266B2

(12) United States Patent
Kim et al.

(10) Patent No.: US 12,641,266 B2
(45) Date of Patent: May 26, 2026

(54) METHOD FOR NEURAL NETWORK-BASED VIDEO ENCODING AND DECODING, AND VIDEO ENCODING APPARATUS

(71) Applicants:SAMSUNG ELECTRONICS CO., LTD., Suwon-si (KR); UNIVERSITY-INDUSTRY COOPERATION GROUP OF KYUNG HEE UNIVERSITY, Yongin-si (KR)

(72) Inventors: Seung Eon Kim, Suwon-si (KR); Yeongwoong Kim, Suwon-si (KR); Hui Yong Kim, Daejeon (KR); Won Hee Lee, Suwon-si (KR); Suyong Bahk, Yongin-si (KR); Young Hun Sung, Suwon-si (KR); Dokwan Oh, Suwon-si (KR)

(73) Assignees: SAMSUNG ELECTRONICS CO., LTD., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 52 days.

(21) Appl. No.: 18/733,379

(22) Filed: Jun. 4, 2024

(65) Prior Publication Data

US 2025/0056024 A1 Feb. 13, 2025

(30) Foreign Application Priority Data

Aug. 7, 2023 (KR) ........................ 10-2023-0102601
Nov. 20, 2023 (KR) ........................ 10-2023-0160501

(51) Int. Cl.
H04N 19/42 (2014.01)
H04N 19/105 (2014.01)
(Continued)

(52) U.S. Cl.
CPC ........... H04N 19/42 (2014.11); H04N 19/105 (2014.11); H04N 19/124 (2014.11); H04N 19/13 (2014.11);
(Continued)

(58) Field of Classification Search
CPC .... H04N 19/42; H04N 19/105; H04N 19/124; H04N 19/13; H04N 19/139; H04N 19/31; H04N 19/61; H04N 19/80; H04N 19/85
(Continued)

(56) References Cited

U.S. PATENT DOCUMENTS 11,257,254 B2 2/2022 Minnen et al.
11,399,198 B1 7/2022 Pourreza et al.
(Continued)

FOREIGN PATENT DOCUMENTS

CN 114501013 A 5/2022
CN 115529457 A 12/2022
(Continued)

OTHER PUBLICATIONS

Communication dated Mar. 24, 2025 issued by the European Patent Office in European Patent Application No. 24193196.3.
(Continued)

*Primary Examiner* — Jayanti K Patel
*Assistant Examiner* — Richard B Carter
(74) *Attorney, Agent, or Firm* — Sughrue Mion, PLLC

(57) ABSTRACT

There is provided a method for neural network-based video encoding. The method includes estimating a motion vector between an input image and a reference image based on a temporal layer of the input image, transforming the motion vector into a latent representation, scaling the latent representation of the motion vector based on the temporal layer of the input image and obtaining a temporal context of the
(Continued)

input image based on the scaled latent representation of the motion vector and the reference image.

9 Claims, 23 Drawing Sheets

(51) Int. Cl.

| | |
|---|---|
| *H04N 19/124* | (2014.01) |
| *H04N 19/13* | (2014.01) |
| *H04N 19/139* | (2014.01) |
| *H04N 19/31* | (2014.01) |
| *H04N 19/61* | (2014.01) |
| *H04N 19/80* | (2014.01) |
| *H04N 19/85* | (2014.01) |

(52) U.S. Cl.
CPC ........... *H04N 19/139* (2014.11); *H04N 19/31* (2014.11); *H04N 19/61* (2014.11); *H04N 19/80* (2014.11); *H04N 19/85* (2014.11)

(58) Field of Classification Search
USPC .................................................. 375/240.15
See application file for complete search history.

(56) References Cited

U.S. PATENT DOCUMENTS

| | | | |
|---|---|---|---|
| 11,412,023 B2 | 8/2022 | Wang et al. | |
| 2019/0373259 A1* | 12/2019 | Xu | H04N 19/176 |
| 2020/0084444 A1* | 3/2020 | Egilmez | H04N 19/70 |
| 2022/0021870 A1 | 1/2022 | Jiang et al. | |
| 2022/0239944 A1 | 7/2022 | Zhang et al. | |
| 2022/0272355 A1* | 8/2022 | Singh | H04N 19/186 |
| 2022/0295095 A1* | 9/2022 | Pourreza | G06N 3/09 |
| 2022/0417540 A1 | 12/2022 | Adzic | |
| 2023/0051066 A1 | 2/2023 | Li et al. | |
| 2023/0127006 A1 | 4/2023 | De Bock | |
| 2024/0378752 A1* | 11/2024 | Westcott | G06T 7/80 |
| 2025/0379978 A1* | 12/2025 | Li | G06N 3/0464 |

FOREIGN PATENT DOCUMENTS

| | | |
|---|---|---|
| EP | 3745305 A1 | 12/2020 |
| EP | 4115602 A1 | 1/2023 |

OTHER PUBLICATIONS

Communication issued on Dec. 19, 2024 from the European Patent Office for European Patent Application No. 24193196.3.

Mu-Jung Chen et al., "B-CANF: Adaptive B-frame Coding with Conditional Augmented Normalizing Flows", Accepted by IEEE Transactions on Circuits and Systems for Video Technology (TCSVT), arXiv:2209.01769v2 [eess.IV], Aug. 2, 2023, 14 pages, XP091579143.

Yeongwoong Kim et al., "Neural Video Compression with Temporal Layer-Adaptive Hierarchical B-frame Coding", arXiv:2308.15791v1 [cs.CV], Aug. 30, 2023, 10 pages, XP091601211.

Lu et al., "DVC: An End-to-end Deep Video Compression Framework", 2019 IEEE/CVF Conference on Computer Vision and Pattern Recognition (CVPR), 2019, pp. 11006-11015, doi:10.1109/CVPR.2019.01126.

Li et al., "Deep Contextual Video Compression", 35th Conference on Neural Information Processing Systems (NeurIPS 2021), Dec. 14, 2021, 19 total pages, arXiv:2109.15047v2 [eess.IV], doi:10.48550/arXiv.2109.15047.

Sheng et al., "Temporal Context Mining for Learned Video Compression", IEEE Transactions on Multimedia, Jan. 30, 2023, 13 total pages, arXiv:2111.13850v2 [cs.CV], doi:10.48550/arXiv.2111.13850.

Yang et al., "Learning for video compression with hierarchical quality and recurrent enhancement", 2020 IEEE/CVF Conference on Computer Vision and Pattern Recognition (CVPR), 2020, 10 total pages, doi:10.1109/CVPR42600.2020.00666.

* cited by examiner

METHOD FOR NEURAL NETWORK-BASED VIDEO ENCODING AND DECODING, AND VIDEO ENCODING APPARATUS

CROSS-REFERENCE TO RELATED APPLICATION(S)

This application is based on and claims priority from Korean Patent Application No. 10-2023-0102601, filed on Aug. 7, 2023 and Korean Patent Application No. 10-2023-0160501, filed on Nov. 20, 2023 in the Korean Intellectual Property Office, the entire disclosures of which are incorporated herein by reference for all purposes.

BACKGROUND

1. Field

The disclosure relates to a method and an apparatus for encoding and decoding data, and more particularly, to a method and an apparatus for neural network-based video encoding and decoding.

2. Description of the Related Art

Recently, the internet video market is continuously growing. However, since a type and/or a quality of services may be limited by network bandwidth, high-level video encoding technology is required. To this end, there has been proposed neural network-based video encoding technology capable of end-to-end training by replacing components of general video encoding technology with neural networks.

SUMMARY

According to one or more aspects of the disclosure, there is provided an apparatus and method for neural network-based video encoding using bidirectional prediction and temporal layer information.

According to an aspect of the disclosure, there is provided a method for neural network-based video encoding, the method including: estimating a motion vector between an input image and a reference image based on a temporal layer of the input image; transforming the motion vector into a latent representation; scaling the latent representation of the motion vector based on the temporal layer of the input image; and obtaining a temporal context of the input image based on the scaled latent representation of the motion vector and the reference image.

The reference image may include a first bidirectional reference image temporally before the input image and a second bidirectional reference image temporally after the input image The scaling based on the temporal layer may include scaling the latent representation of the motion vector by using a smaller quantization step for a higher temporal layer.

The scaling based on the temporal layer may include scaling the latent representation of the motion vector by dividing the latent representation of the motion vector into quantization step determining parameters defined for the temporal layer.

The method may further include: performing entropy encoding and entropy decoding on the latent representation of the motion vector; rescaling the scaled latent representation of the motion vector based on the temporal layer; and reconstructing motion vectors based on the rescaled latent representation of the motion vector, wherein the obtaining of the temporal context may include obtaining the temporal context based on the reconstructed motion vectors and the reference image.

The rescaling based on the temporal layer may include multiplying the scaled latent representation of the motion vector by the quantization step determining parameters defined for the temporal layer.

The method may further include: before performing the entropy encoding and entropy decoding, quantizing the scaled latent representation of the motion vector; and estimating a probability distribution of the latent representation of the motion vector.

The obtaining of the temporal context may include: outputting a reference feature map by inputting the reference image into a feature extraction neural network, performing bilinear warping on the reference feature map based on the reconstructed motion vectors to output a warped reference feature map, inputting the warped reference feature map to a post-processing neural network, and inputting an output of the post-processing neural network to a context fusion network to output the temporal context.

According to another aspect of the disclosure, there is provided a method for neural network-based video encoding, the method may include: estimating a motion vector between an input image and a reference image based on a temporal layer of the input image; transforming the motion vector into a latent representation; obtaining a temporal context of the input image based on the latent representation of the motion vector and the reference image; and performing a smoothing operation on the temporal context based on a smoothing object including at least one of the reference image, the input image, the motion vector, an input in the obtaining of the temporal context, an output in the obtaining of the temporal context, or an input or output of a sub-process in the obtaining of the temporal context.

The reference image may include a first bidirectional reference image temporally before the input image and a second bidirectional reference image temporally after the input image.

The performing of the smoothing may include: obtaining a smoothing level of the smoothing object for the temporal layer of the input image; generating a smoothing filter based on the smoothing level; and performing the smoothing on the smoothing object based on the smoothing filter.

The obtaining of the smoothing level of the smoothing object may include obtaining a lower smoothing level for a lower temporal layer.

The obtaining of the smoothing level of the smoothing object may include obtaining different smoothing levels depending on spatial positions.

According to another aspect of the disclosure, there is provided a method for neural network-based video decoding, the method including: reconstructing a latent representation of a motion vector based on a first bitstream for the motion vector; rescaling the reconstructed latent representation of the motion vector based on a temporal layer; reconstructing the motion vector based on the rescaled latent representation of the motion vector; obtaining a temporal context based on the reconstructed motion vector and a reference image; and reconstructing an input image based on a second bitstream for the input image and the temporal context.

The reference image may include a first bidirectional reference image temporally before the input image and a second bidirectional reference image temporally after the input image.

The rescaling based on the temporal layer may include multiplying the latent representation of the motion vector by quantization step determining parameters defined for the temporal layer.

The reconstructing of the input image may include: reconstructing a latent representation of the input image based on the second bitstream for the input image; rescaling the latent representation of the input image based on the temporal layer; and reconstructing the input image based on the rescaled latent representation of the input image and the temporal context.

According to another aspect of the disclosure, there is provided a method for neural network-based video decoding, the method including: reconstructing a latent representation of a motion vector based on a first bitstream for the motion vector; obtaining a temporal context by using the motion vector and a reference image; performing smoothing by using, as a smoothing object, at least one of the reference image, the motion vector, an input in the obtaining of the temporal context, an output in the obtaining of the temporal context, and an input or output of a sub-process in the obtaining of the temporal context; and reconstructing the input image based on a second bitstream for an input image and the temporal context.

The performing of the smoothing may include: obtaining different smoothing levels based on at least one of a temporal layer and a spatial position of the input image; generating a smoothing filter based on the smoothing level; and performing the smoothing on the smoothing object based on the smoothing filter.

According to another aspect of the disclosure, there is provided an electronic device including: a memory configured to store one or more instructions and a reference image; and a processor configured to execute the one or more instructions to: estimate a motion vector between an input image and the reference image based on the reference image, the input image, and a temporal layer of the input image; transform the motion vector into a latent representation; scale the latent representation of the motion vector based on the temporal layer of the input image; and obtain a temporal context of the input image based on the scaled latent representation of the motion vector and the reference image.

DETAILED DESCRIPTION

Figure 1A:
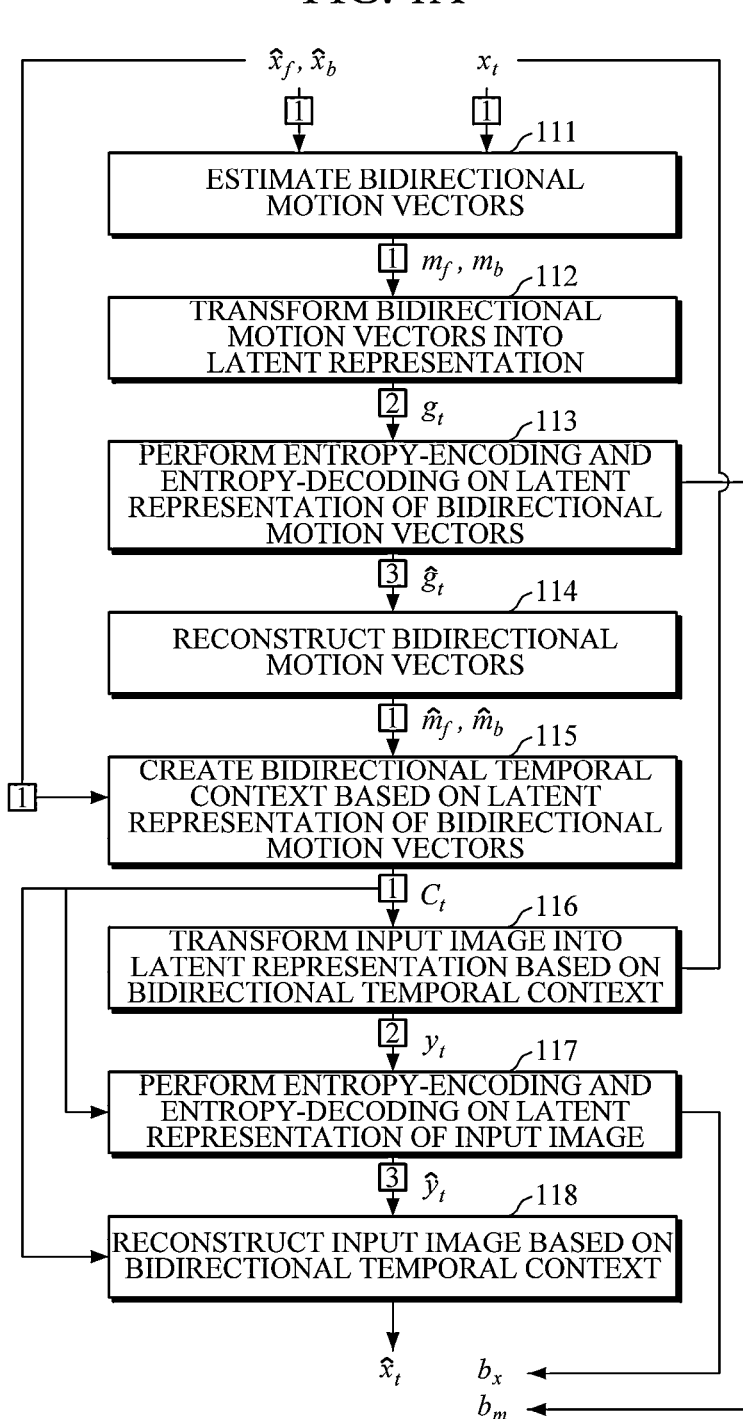
FIG. 1A is a flowchart illustrating a method for neural network-based video encoding according to an embodiment of the disclosure.

Details of other embodiments are included in the following detailed description and drawings. Advantages and features of the present invention, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements.

Embodiments herein may be described and illustrated in terms of blocks which carry out a described function or functions. These blocks, which may be referred to herein as units, modules, or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. However, the disclosure is not limited thereto, and as such, the blocks, which may be referred to herein as units, modules, or the like, may be software modules implemented by software codes, program codes, software instructions, or the like. The software blocks may be executed on one or more processors. According to an embodiment, the terms, such as "block", "unit", "module," or the like, should be understood as a unit that performs at least one function or operation and that may be embodied as hardware, software, or a combination thereof.

Expressions, such as "at least one of," for example, the expression, "at least one of a, b, and c," should be construed as including only a, only b, only c, both a and b, both a and c, both b and c, or all of a, b, and c.

FIG. 1A is a flowchart illustrating a method for neural network-based video encoding according to an embodiment of the disclosure.

Referring to FIG. 1A, an example of a method for video encoding using bidirectional prediction and/or temporal layer information will be described below. According to an embodiment, the method may be performed by a video encoding apparatus based on neural network. By using the bidirectional prediction, a higher encoding performance may be achieved than a unidirectional prediction. A flow of the method for video encoding using bidirectional prediction will be described first, followed by a description of a method of using temporal layer information.

According to an embodiment, in operation 111, the method may include estimating bidirectional motion vectors. For example, the video encoding apparatus based on bidirectional prediction may estimate bidirectional motion vectors $m_f, m_b$ by using bidirectional reference images $\hat{x}_f, \hat{x}_b$ and an input image $x_t$ as input. The input image $x_t$ refers to an image to be encoded at a current time t in a sequence of images constituting a video. According to an embodiment, a reference image may refer to an already decoded image (e.g., a previous image) and/or an image referenced for encoding or decoding the input image $x_t$. The bidirectional reference images refer to images before and/or after the time t of the input image $x_t$. For example, an image from before the time t of the input image may be referred to as a forward reference image $\hat{x}_f$ and an image from after the time t of the input image may be referred to as a backward reference image $\hat{x}_b$. There may be one or more forward reference images and backward reference images, but for convenience of explanation, the following description will be given using an example in which there is one forward reference image and one backward reference image.

According to an embodiment, in operation 112, the method may include transforming bidirectional motion vectors into latent representation. For example, the bidirectional motion vectors $m_f, m_b$ may be transformed into a latent representation $g_t$ of the bidirectional motion vectors by using a neural network. The neural network may include, but is not limited to, a Convolutional Neural Network (CNN) or the like. Here, the latent representation is an output of a neural network using an input image or motion information as input, and collectively refers to a latent feature, latent vector, and the like.

According to an embodiment, in operation 113, the method may include performing entropy-encoding or entropy-decoding on latent representation of the bidirection motions vectors. For example, the latent representation $g_t$ of the bidirectional motion vectors may be quantized and entropy-encoded to be represented as a bitstream $b_m$ of the bidirectional motion vectors and transmitted to a decoder, and by entropy-decoding the bitstream $b_m$ of the motion vectors, the quantized latent representation $\hat{g}_t$ of the motion vectors may be reconstructed.

According to an embodiment, in operation 114, the method may include reconstructing bidirectional motion vectors. For example, by using the quantized latent representation $\hat{g}_t$ of the motion vectors, bidirectional motion vectors $\hat{m}_f, \hat{m}_b$ may be reconstructed.

According to an embodiment, in operation 115, the method may include creating or generating temporal context based on the latent representation of the bidirectional vectors. For example, by using the reconstructed bidirectional motion vectors $\hat{m}_f, \hat{m}_b$ and the bidirectional reference images $\hat{x}_f, \hat{x}_b$, a bidirectional temporal context $C_t$ may be created. The bidirectional temporal context $C_t$ may be a feature map with a single resolution or a feature map with two or more resolutions, and may be prediction information about the input image $x_t$ for use in encoding and decoding the input image $x_t$.

According to an embodiment, in operation 116, the method may include transforming input image into latent representation based on bidirectional temporal context. For example, the input image $x_t$ may be transformed into a latent representation $y_t$ of the input image by transforming the input image into a latent representation based on the bidirectional temporal context $C_t$.

According to an embodiment, in operation 117, the method may include performing entropy-encoding or entropy-decoding on latent representation of input image. For example, the latent representation $y_t$ of the input image may be entropy-encoded to be represented as a bitstream $b_x$ of the input image and transmitted to the decoder. According to an embodiment, by entropy-decoding the bitstream $b_x$ of the input image, a quantized latent representation $\hat{y}_t$ of the input image may be reconstructed.

According to an embodiment, in operation 118, the method may include reconstructing the input image based on the bidirectional temporal context. For example, by using the quantized latent representation $\hat{y}_t$ of the input image, the input image $\hat{x}_t$ may be reconstructed. In this case, the bidirectional temporal context $C_t$ may be used as an additional input. The reconstructed image $\hat{x}_t$ may be used as a reference image for subsequent images.

According to an embodiment, the method for video encoding using bidirectional prediction may further use a temporal layer $l_t$. The method of using the temporal layer may include a method of scaling and rescaling according to a temporal layer and/or a method of smoothing according to a temporal layer.

Referring to FIG. 1A, scaling according to a temporal layer may be performed on the latent representation $g_t$ of the bidirectional motion vectors at $\boxed{2}$ and/or on the latent representation $y_t$ of the input image at $\boxed{2}$, and rescaling may be performed on the latent representation $\hat{g}_t$ of the bidirectional motion vectors at $\boxed{3}$ and/or on the latent representation $\hat{y}_t$ of the input image at $\boxed{3}$.

In a comparative video encoding method, different encoding methods and neural network models may be used for temporal layers, and such methods may require storing various neural network models for temporal layers, such that the video compression method is inefficient in terms of complexity such as memory efficiency and the like. According to an embodiment, by using a single neural network model for temporal layers, scaling and rescaling may be performed according to temporal layers. In this case, a latent representation may be scaled differently depending on temporal layers. In the scaling according to the temporal layers, before uniform quantization is performed on the latent representation, scaling is performed by dividing the latent representation into scale parameters that are determined differently for temporal layers, and after entropy-encoding and decoding are performed, rescaling is performed by multiplying the scaled latent representation by the previously determined scale parameters.

Referring to FIG. 1A, smoothing according to temporal layers may be performed at all or some of positions ☐. While FIG. 1 illustrates an example in which both scaling and smoothing are performed according to temporal layers, this is merely exemplary and the disclosure is not limited thereto, and scaling and smoothing may be performed selectively. Smoothing may be performed on various smoothing objects depending on the positions where smoothing is performed.

In an example case in which smoothing is performed between operation 111 of estimating the bidirectional motion vectors and operation 112 of transforming the latent representation of the bidirectional motion vectors, the bidirectional motion vectors $m_f, m_b$ are the smoothing objects. However, the smoothing is not limited thereto, and in addition to the smoothing positions illustrated in FIG. 1, smoothing according to temporal layers may be performed between various neural networks used in operation 115 of creating a bidirectional temporal context based on the latent representation of the motion vectors.

Generally, a neural network used for creating a bidirectional temporal context is trained to create a bidirectional temporal context that may improve average encoding performance for an input image to be learned. However, in an example case in which a motion vector is estimated incorrectly or in an example case in which a video contains complex motions, there is a possibility that neural networks trained to create the bidirectional temporal context may rather have an adverse effect on the encoding performance of individual input images. For example, in Hierarchical B-frame encoding, a distant reference image is used more than in a unidirectional prediction structure, thereby resulting in a significant decrease in encoding performance caused by the use of bidirectional temporal context which is not optimized for each temporal layer.

On the other hand, according to an embodiment of the disclosure, as a method of regulating the incorrect temporal context caused by the use of bidirectional temporal context which is not optimized for each temporal layer, smoothing is performed differently for temporal layers on temporal context or information for creating the temporal context, thereby creating a temporal context which is smoothed differently for temporal layers. A higher smoothing level may be used for a higher temporal layer, and a lower smoothing level may be used for a lower temporal layer. In this manner, the incorrect temporal context may be regulated, thereby achieving higher encoding performance compared to common technology.

Figure 1B:
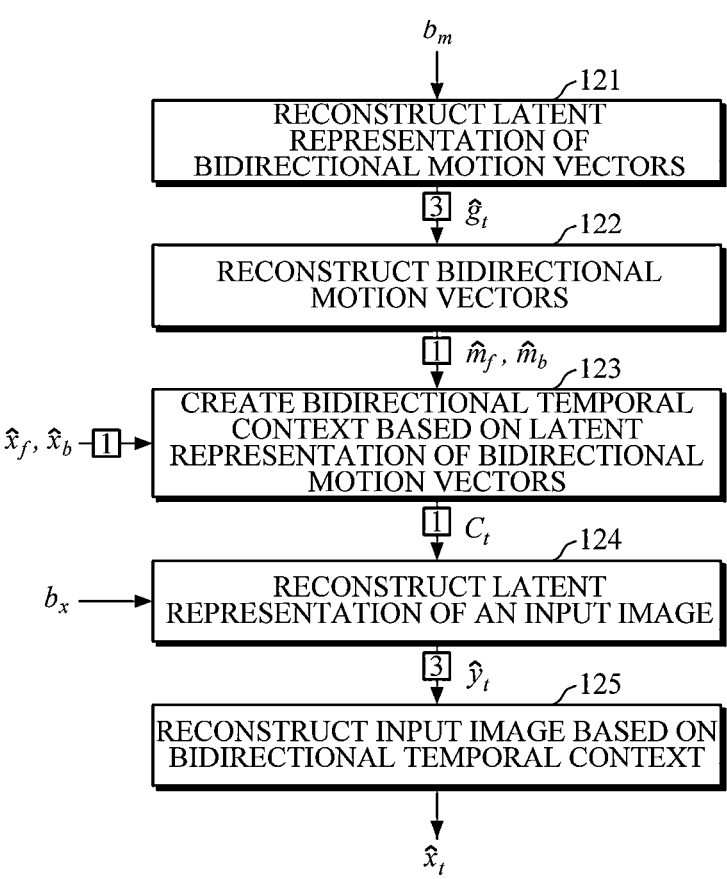
FIG. 1B is a flowchart illustrating a method for neural network-based video decoding according to an embodiment of the disclosure.

FIG. 1B is a flowchart illustrating a method for neural network-based video decoding according to an embodiment of the disclosure.

Referring to FIG. 1B, an example of a method for video decoding using bidirectional prediction and/or temporal layer information, which is performed by a video decoding apparatus based on neural network, will be described below. For details on operations of the method for video decoding, reference may be made on corresponding operations thereof described throughout the specification.

According to an embodiment, in operation 121, the method may include reconstructing latent representation of the bidirectional motion vectors. For example, the video decoding apparatus may reconstruct a latent representation $\hat{g}_t$ of bidirectional motion vectors by using a bitstream $b_m$ for the bidirectional motion vectors. The video encoding apparatus may generate the bitstream $b_m$ for the bidirectional motion vectors by quantization and/or entropy encoding, as described above, for example, with reference to FIG. 1A. By performing entropy decoding using the bitstream $b_m$ for the motion vectors, the latent representation of the motion vectors may be reconstructed, in which case entropy decoding may be performed with the mean and the standard deviation used in the entropy encoding process. The entropy decoding may be arithmetic decoding.

According to an embodiment, in operation 122, the method may include reconstructing bidirectional motion vectors. For example, the video decoding apparatus may reconstruct the bidirectional motion vectors $\hat{m}_f, \hat{m}_b$ by using the latent representation $\hat{g}_t$ of the bidirectional motion vectors.

According to an embodiment, in operation 123, the method may include creating or generating bidirectional temporal context based on latent representation of bidirectional motion vectors. For example, the video decoding apparatus may create a temporal context by using the latent representation $\hat{g}_t$ of the bidirectional motion vectors. In this case, the video decoding apparatus may create a bidirectional temporal context $C_t$ by using bidirectional reference images $\hat{x}_f, \hat{x}_b$.

According to an embodiment, in operation 124, the method may include reconstructing the latent representation of an input image. For example, the video decoding apparatus may reconstruct a latent representation $\hat{y}_t$ of an input image by using a bitstream $b_x$ of the input image as input. In this case, the bitstream $b_x$ of the input image may be generated by quantization and/or entropy encoding in the video encoding process. By performing entropy decoding using the bitstream $b_x$ of the input image, the latent representation of the input image may be reconstructed, in which case entropy decoding may be performed with the mean and the standard deviation used in the entropy encoding process. The entropy decoding may be arithmetic decoding.

According to an embodiment, in operation 125, the method may include reconstructing the input image based on the bidirectional temporal context. For example, the video decoding apparatus may reconstruct an input image $\hat{x}_t$ based on a bidirectional temporal context by using the latent representation of the input image and a temporal context $C_t$. The reconstructed image $\hat{x}_t$ may be used as a reference image for subsequent images.

According to an embodiment, the method for video decoding using bidirectional prediction may further use a temporal layer. The method of using the temporal layer may include a scaling and rescaling method according to a temporal layer and/or a smoothing method according to a temporal layer, in which both the methods may be performed or either one of the methods may be performed selectively in the video decoding process.

Referring to FIG. 1B, in an example case in which scaling is performed during video encoding (at positions ② in FIG. 1A), rescaling may be performed at positions ③ on the latent representation of the bidirectional motion vectors and/or the latent representation of the input image. Rescaling may be performed by multiplying the latent representation, scaled after entropy decoding, by scale parameters (quantization step determining parameters) used in the video encoding process.

According to an embodiment, smoothing may be performed by using, as a smoothing object, at least one of the reference images $\hat{x}_f, \hat{x}_b$, the motion vector, an input in the creating of the temporal context in 123, an output in the creating of the temporal context in 123, an input or output of a sub-process in the creating of the temporal context in 123. For example, the smoothing may be performed according to temporal layers. For example, referring to FIG. 1B, smoothing according to temporal layers may be performed at all or some of positions ⊡. Smoothing may be performed on various smoothing objects depending on the positions where smoothing is performed.

Figure 2A:
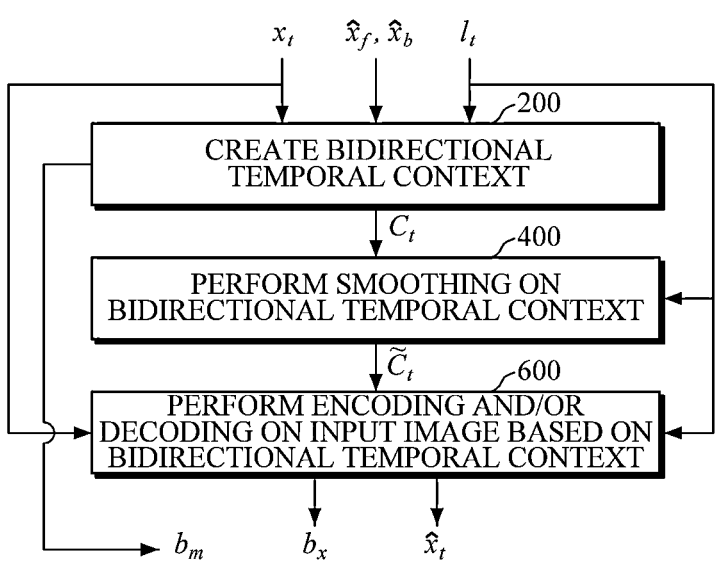
FIG. 2A is a flowchart illustrating a method for neural network-based video encoding according to another embodiment of the disclosure.

FIG. 2A is a flowchart illustrating a method for neural network-based video encoding according to another embodiment of the disclosure. The method may be performed by an apparatus configured to perform video encoding and/or decoding based on neural network. In FIG. 2A, the flowchart illustrates a method for video encoding by using an example in which smoothing is performed at an output position in operation 115 of creating a bidirectional temporal context based on a latent representation of the motion vector in FIG. 1A. While it is illustrated that the smoothing position is the output position in operation 115 of creating a bidirectional temporal context based on a latent representation of the motion vector, the smoothing position is not limited thereto and may be easily applied to other smoothing positions. That is, smoothing may be performed on the reference image, input image, motion vector, input in the operation of creating the temporal context, output in the operation of creating the temporal context, and input or output in the detailed operation of creating the temporal context.

Although the following description will be focused on video encoding, the disclosure is not limited thereto, and as such, the description may also be applied to decoding.

According to an embodiment, in operation 200, the method may include creating and generating bidirectional temporal context. For example, the video encoding apparatus may output a bidirectional temporal context $C_t$ of an input image and/or a bitstream $b_m$ for a bidirectional motion vector by using bidirectional reference images $\hat{x}_f, \hat{x}_b$ and a temporal layer $l_t$ of an input image in 200.

The input image $x_t$ refers to an image to be encoded at a current time t in a sequence of images constituting a video. The reference image refers to an already decoded image and an image referenced for encoding or decoding the input image $x_t$. The bidirectional reference images refer to images before/after the time t of the input image $x_t$, which are referred to as a forward reference image $\hat{x}_f$ and a backward reference image $\hat{x}_b$, respectively. There may be one or more forward reference images and backward reference images, but for convenience of explanation, the following description will be given using an example in which there is one forward reference image and one backward reference image. The bidirectional temporal context $C_t$ may be a feature map with a single resolution or a feature map with two or more resolutions. The temporal layer $l_t$ refers to each layer in an example case in which images in a video are temporally layered so that higher-layer images may be encoded even without decoding lower-layer images.

According to an embodiment, in operation 400, the method may include performing a smoothing operation the bidirectional temporal context. For example, the video compression apparatus may perform smoothing on the bidirectional temporal context $C_t$ according to the temporal layer $l_t$ by using the bidirectional temporal context $C_t$ and the temporal layer $l_t$ of the input image, and may output a smoothed bidirectional temporal context $\tilde{C}_t$ in 400. In this case, the video compression apparatus may apply different smoothing levels to the bidirectional temporal context according to temporal layers and/or spatial positions in order to regulate incorrect temporal context which is caused by the use of bidirectional temporal context which is not optimized for each temporal layer. According to an embodiment, the video compression apparatus may apply a first smoothing level to a bidirectional temporal context corresponding to a first temporal layer, and a second smoothing level to a bidirectional temporal context corresponding to a second temporal layer. Here, the first smoothing level may be different than the second smoothing level. According to an embodiment, the video compression apparatus may apply a first smoothing level to a bidirectional temporal context corresponding to a first spatial position, and a second smoothing level to a bidirectional temporal context corresponding to a second spatial position Here, the first spatial position may be different from the second spatial position. For example, the spatial position may be a spatial region or a spatial area.

According to an embodiment, in operation 600, the method may include performing encoding or decoding operation on input image based on the bidirectional temporal context. For example, by using, as input, the smoothed bidirectional temporal context $\tilde{C}_t$ and the input image $x_t$, the video compression apparatus may perform encoding on the input image to output a bitstream $b_x$, and if necessary, may perform decoding based on the smoothed bidirectional temporal context $\tilde{C}_t$ and the bitstream $b_x$ to output a reconstructed image $\hat{x}_t$ in 600. The reconstructed image $\hat{x}_t$ may be used as a reference image for encoding subsequent input images.

Figure 2B:
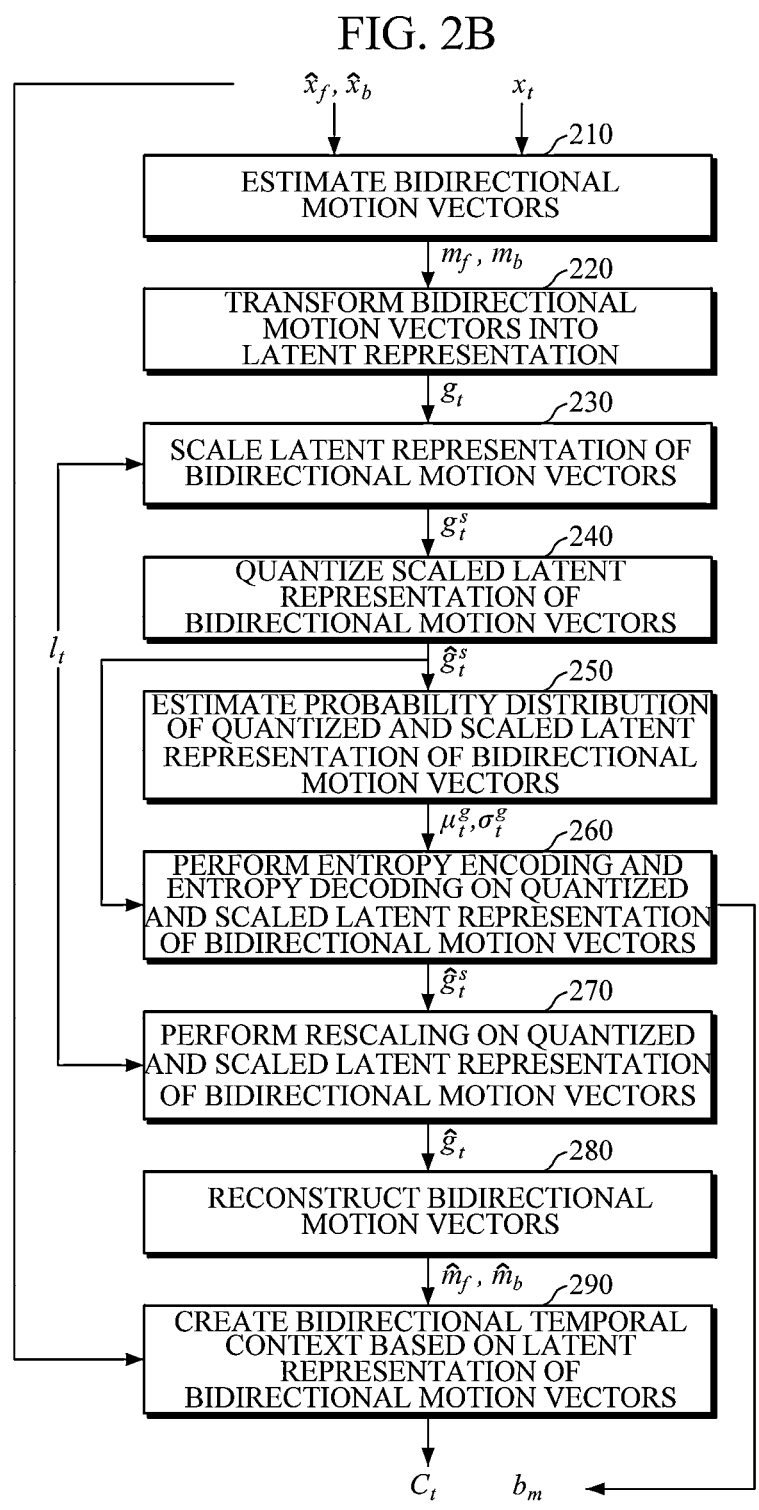
FIG. 2B is a flowchart illustrating an operation of creating a bidirectional temporal context according to an embodiment of the disclosure.
Figure 3A:
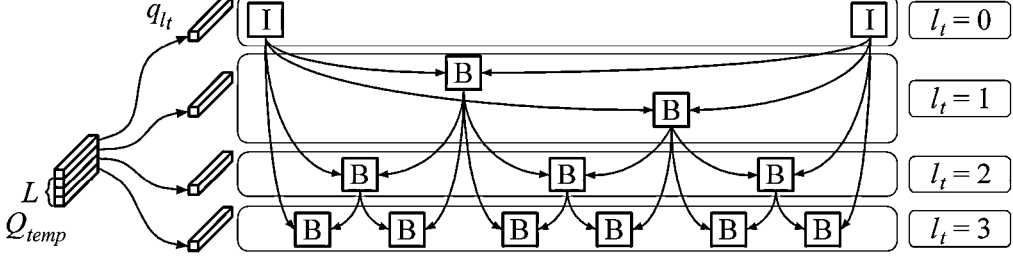
FIGS. 3A and 3B are diagrams explaining an example of scaling and rescaling according to a temporal layer.
Figure 3B:
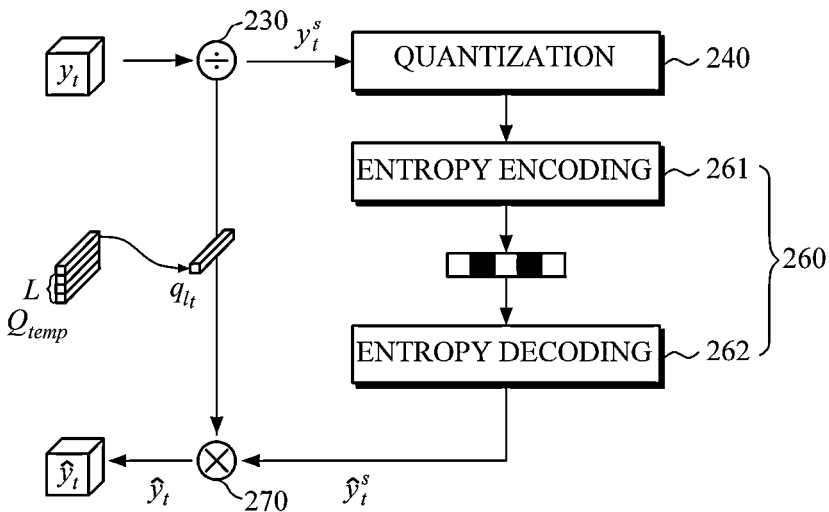

FIG. 2B is a flowchart illustrating operation 200 of creating a bidirectional temporal context according to an embodiment of the disclosure. FIGS. 3A and 3B are diagrams explaining an example of scaling and rescaling according to a temporal layer. An example of operation 200 of creating a bidirectional temporal context will be described below with reference to FIGS. 2B, 3A, and 3B. As described above, scaling and rescaling may be selectively omitted.

According to an embodiment, in operation 600, the method may include estimating bidirectional motion vectors. For example, by using an input image $x_t$ and bidirectional reference images $\hat{x}_f, \hat{x}_b$, the video encoding apparatus may estimate bidirectional motion information between the input image $x_t$ and the respective reference images $\hat{x}_f, \hat{x}_b$ in 210. The input image $x_t$ and the bidirectional reference images $\hat{x}_f, \hat{x}_b$ are input to a neural network, and motion vectors $m_f, m_b$ and/or pixel-wise optical flow may be output as motion information According to an embodiment, in operation 220, the method may include transforming the bidirectional motion vectors into latent representation. For example, the video compression apparatus may transform bidirectional motion vectors $m_f, m_b$ into a latent representation $g_t$ of the bidirectional motion vectors. The bidirectional motion vectors $m_f, m_b$ may be input to a neural network to be transformed into the latent representation $g_t$. For example, the neural network may include, but is not limited to Convolutional Neural Network (CNN). Here, the latent representation is an output of a neural network using an input image or motion information as input, and collectively refers to a latent feature, latent vector, and the like.

According to an embodiment, in operation 230, the method may include scaling latent representation of the bidirectional motion vectors. For example, by using, as input, the latent representation $g_t$ of the bidirectional motion vectors $m_f, m_b$ a according to the temporal layer $l_t$ and the temporal layer $l_t$ of the input image, the video compression apparatus may scale the latent representation according to the temporal layer $l_t$, and may output a scaled latent representation $g_t^s$ of the bidirectional motion vectors.

The same single neural network model may be used for the respective bidirectional motion vectors $m_f, m_b$, and scaling may be performed differently for each temporal layer. According to an embodiment, the latent representation may be scaled by using a single neural network, thereby improving memory efficiency compared to a typical method of using various neural network models according to temporal layers.

For example, the scaling may be performed by dividing the latent representation $g_t$ of the bidirectional motion vectors into predefined scale parameters according to temporal layers. Scaling of the latent representation according to temporal layers has an effect which is the same as or equivalent to an effect produced by adjusting a quantization step, such that the term "scale parameter" in the following description will be referred to as a "quantization step determining parameter." The quantization step determining parameter may be learned in advance to determine an optimal quantization step for each temporal layer. In a case in which an image is in a higher temporal layer, as a temporal layer value decreases, the image is used as a reference image in many instances, and thus the image may be reconstructed with a higher picture quality level compared to an image in a lower temporal layer. For example, in case in which the image in the higher temporal layer, a distance between the input image and the reference image is longer than a case in which an image is in a lower temporal layer than the higher temporal layer. To this end, the quantization step determining parameter may be learned to use a smaller quantization step for a higher temporal layer, and a larger quantization step for a lower temporal layer.

Assuming that there is a latent representation $y \in \mathbb{R}^{C \times H \times W}$ of an input image or bidirectional motion vectors (herein R: real number, C: the number of channels in the latent representation represented as a feature map, and H, W: the spatial height and width of the latent representation), a quantization step determining parameter set $Q_{temp}$ and a quantization step determining parameter $q_{l_t}$ for the temporal layer $l_t$ of the input image may be defined as the following Equation 1. Here, L denotes a total number of temporal layers.

$$Q_{temp} \in \mathbb{R}^{L \times C}, \quad q_{l_t} = Q_{temp}[l_t] \in \mathbb{R}^{C}, \quad l_t = 0, 1, \ldots, L \qquad \text{[Equation 1]}$$

FIG. 3A is a diagram illustrating an example of using different quantization step determining parameters for four temporal layers ($l_t$=0, 1, 2, 3) in a bidirectional prediction structure in which a Group Of Pictures (GOP) size is 12. For convenience of explanation, a highest temporal layer contains only an I-frame, i.e., an image to which a still image coding method is to be applied, but is not limited thereto. In FIG. 3A, I denotes an I-frame, and B denotes a B-frame.

Referring back to FIG. 2B, according to an embodiment, in operation 240, the method may include quantizing scaled latent representation of bidirectional motion vectors. For example, by using the scaled latent representation $$g_t^s$$

of the bidirectional motion vectors as input, quantization is performed on the scaled latent representation to output the quantized and scaled latent representation $$\hat{g}_t^s$$

of the bidirectional motion vectors. In this case, the quantization may be performed using uniform quantization, i.e., a rounding operation, but is not limited thereto.

According to an embodiment, in operation 250, the method may include estimating probability distribution of quantized and scaled latent representation of bidirectional motion vectors. For example, by using the quantized and scaled latent representation $$\hat{g}_t^s$$

of the bidirectional motion vectors as input, a probability distribution of the latent representation $$\hat{g}_t^s$$

may be estimated for entropy encoding the latent representation $$\hat{g}_t^s.$$

An entropy model may be used, and based on the assumption that the latent representation follows the distribution such as Laplacian distribution or Gaussian distribution, etc., the entropy model may output a mean $$\mu_t^g$$

and a standard deviation $$\sigma_t^g$$

of the distribution.

According to an embodiment, in operation 260, the method may include performing entropy encoding or decoding on quantized and scaled latent representation of bidirectional motion vectors. For example, entropy encoding and entropy decoding may be performed on the quantized and scaled latent representation $$\hat{g}_t^s$$

of the bidirectional motion vectors. By using, as input, the quantized and scaled latent representation $$\hat{g}_t^s$$

of the motion vectors and the mean $$\mu_t^g$$

and the standard deviation $$\sigma_t^g$$

which are estimated in 250, entropy encoding may be performed on the latent representation $$\hat{g}_t^s$$

to output a bitstream $b_m$. In addition, by using the entropy-encoded bitstream $b_m$ as input, entropy decoding may be performed with the mean $$\mu_t^g$$

and the standard deviation $$\sigma_t^g$$

used in the entropy encoding process, to reconstruct the latent representation $$\hat{g}_t^s.$$

The entropy encoding process is generally lossless encoding, such that the reconstructed latent representation $$\hat{g}_t^s$$

is the same as an input $$\hat{g}_t^s$$

of an entropy encoder. The entropy encoding and decoding may be performed using common arithmetic encoding and arithmetic decoding, etc., but is not limited thereto.

According to an embodiment, in operation 270, the method may include performing rescaling operation on quantized and scaled latent representation of bidirectional motion vectors. For example, by using, as input, the temporal layer $l_t$ of the input image and the quantized and scaled latent representation $$\hat{g}_t^s$$

of the bidirectional motion vectors, rescaling is performed to return the latent representation to an original scale and output the rescaled latent representation $\hat{g}_t$ of the bidirectional motion vectors.

FIG. 3B is a diagram explaining an example of scaling and rescaling a latent representation for an $l_t$-th temporal layer.

Referring to the above Equation 1 and FIG. 3B, scaling may be performed in operation 230 by dividing C number of channel maps into C number of parameters of the quantization step determining parameters $q_l^t$, which may be represented by the following Equation 2.

$$y_t^s[c][h][w] = y_t^s[c][h][w] \div q_{l_t}[c] \qquad \text{[Equation 2]}$$

$$c = 0, 1, \dots, C-1, h = 0, 1, \dots, H-1, w = 0, 1, \dots, W-1$$

Herein, C denotes the number of channels in the latent representation represented as a feature map, and H,W respectively denote the spatial height and width of the latent representation.

Quantization (240) and entropy encoding (261) and decoding (262) are performed on the scaled latent representation $y_t^s$, and rescaling (270) may be performed by multiplying a quantization step determining parameter $q_l^t$, which is the same as that used in the scaling process, by the quantized and scaled latent representation $$\hat{y}_t^s.$$

As a result, a quantized and rescaled latent representation $\hat{y}_t$ is output. The rescaling may be represented by the following Equation 3.

$$\hat{y}_t[c][h][w] = \hat{y}_t^s[c][h][w] \times q_{l_t}[c] \qquad \text{[Equation 3]}$$

$$c = 0, 1, \dots, C-1, h = 0, 1, \dots, H-1, w = 0, 1, \dots, W-1$$

By using the same neural network model, different quantization steps may be applied to images of different temporal layers, thereby encoding with different image quality levels for each temporal layer. In addition, only a small number of neural network parameters are stored in a memory and used, thereby improving memory efficiency.

Referring back to FIG. 2B, according to an embodiment, in operation 280, the method may include reconstructing bidirectional motion vectors. For example, by using the rescaled latent representation $\hat{g}_t$ of the bidirectional motion vectors as input, the bidirectional motion vectors $\hat{m}_f, \hat{m}_b$ may be reconstructed and output. In this case, a Convolutional Neural Network may be used, but the neural network is not limited thereto.

According to an embodiment, in operation 290, the method may include creating or generating bidirectional temporal context based on latent representation of the bidirectional motion vectors. For example, by using the reconstructed motion vectors $\hat{m}_f, \hat{m}_b$ and the reference images $\hat{x}_f, \hat{x}_b$ as input, a bidirectional temporal context $C_t$ for encoding the input image may be created and output. In this case, a motion compensation technique and Convolutional Neural Network may be used. The motion compensation technique may use bilinear warping, but is not limited thereto.

Figure 4:
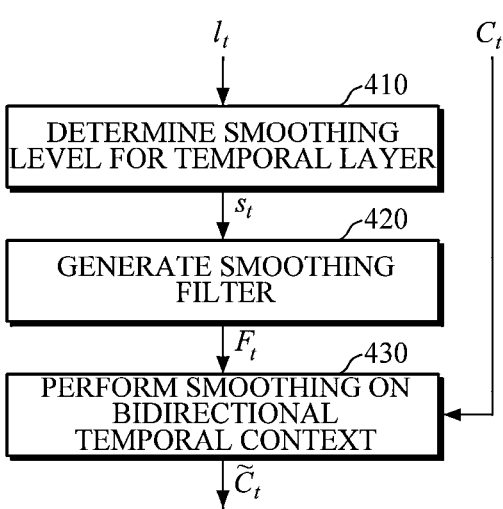
FIG. 4 is a flowchart illustrating an operation of smoothing a bidirectional temporal context according to an embodiment of the disclosure.
Figure 5:
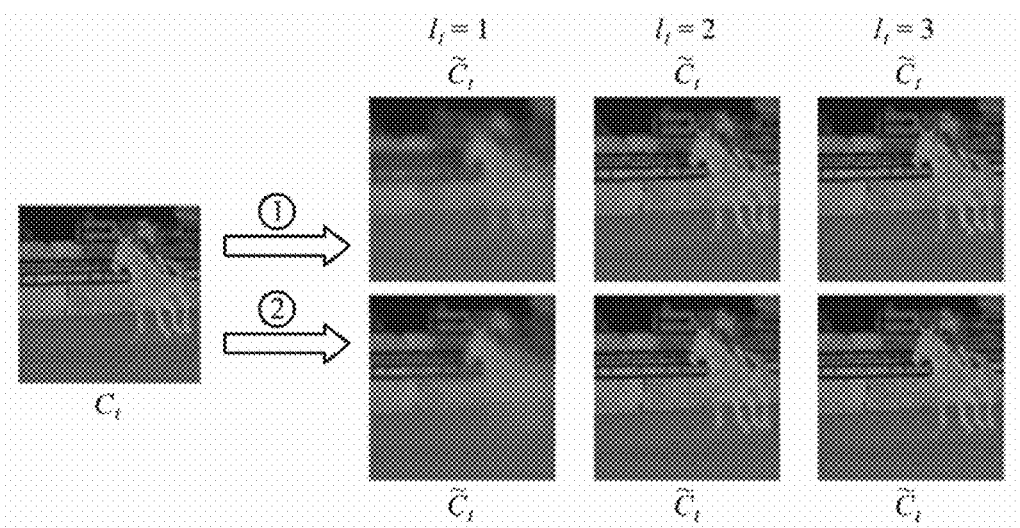
FIG. 5 is a diagram explaining an example of smoothing a bidirectional temporal context according to a temporal layer.

FIG. 4 is a flowchart illustrating operation 400 of smoothing a bidirectional temporal context according to an embodiment of the disclosure. FIG. 5 is a diagram explaining an example of smoothing a bidirectional temporal context according to a temporal layer.

Operation 400 of smoothing a bidirectional temporal context in FIG. 4 may include operation 410 of determining a smoothing level $s_t$ for temporal layers $l_t$, operation 420 of creating a smoothing filter $F_t$, and smoothing operation 430.

The smoothing filter may be a predefined filter, such as a Gaussian filter or a bilateral filter based on a Gaussian filter, or may be a trainable filter such as a Convolutional Neural Network, but is not limited thereto. In an example case in which the trainable filter is used as the smoothing filter, multiple trainable filters may be trained differently for the temporal layers $l_t$, and one of the trainable filters may be selected according to the temporal layers $l_t$ for use. In an example case in which the Gaussian filter is used as the smoothing filter, the smoothing level $s_t$ may be a standard deviation, and if in an example case in which smoothing filter is a trainable filter, the filter may be the index of filters that are trained differently for the temporal layers.

Operation 400 of smoothing a bidirectional temporal context will be described below based on an example of using a predefined smoothing filter as the smoothing filter.

According to an embodiment, in operation 410, the method may include determining smoothing level for temporal layer. For example, by using the temporal layer $l_t$ of the input image as input, the video encoding apparatus may determine and output a smoothing level for smoothing a bidirectional temporal context $C_t$.

For example, the Gaussian filter may be used, and a standard deviation for creating the Gaussian filter may be output as a smoothing level. In this case, by determining a constant value according to the temporal layers, the constant value may be used as it is as the standard deviation, or the standard deviation may be used by learning different parameters according to temporal layers. A higher smoothing level (large standard deviation) may be output for a higher temporal layer, and a lower smoothing level (small standard deviation) may be output for a lower temporal layer. Even in the same temporal layer, different smoothing levels for a bidirectional temporal context may be determined according to spatial positions. In this case, information output during decoding in operation 260 may be used as spatial position information for smoothing. During decoding in operation 260, smoothing information for spatial positions may also be output.

According to an embodiment, in operation 420, the method may include generating smoothing filter. For example, by determining a parameter of the predefined filter by using the smoothing level $s_t$ determined in operation 410 as input, a smoothing filter $F_t$ to be applied to actual smoothing may be generated. The predefined filter may include, but is not limited to, for example, a Gaussian filter or a bilateral filter using a Gaussian kernel, etc.

According to an embodiment, in operation 430, the method may include performing smoothing operation on bidirectional temporal context. For example, smoothing is performed on the bidirectional temporal context by using as input the smoothing filter generated in operation 420, and then the smoothed bidirectional temporal context $\tilde{C}_t$ may be output.

FIG. 5 is a diagram illustrating an example of a bidirectional temporal context which is smoothed by using different smoothing levels for different temporal layers or different spatial positions. For example, in FIG. 5, arrow ① shows a result of applying a lower smoothing level to a lower temporal layer, i.e., as the temporal layer $l_t$ increases. In addition, arrow ② of FIG. 5 shows a result of using different smoothing levels for spatial positions even in the same temporal layer, in which $C_t$ and $\tilde{C}_t$ denote average values calculated for all channels for ease of visualization.

Generally, there is a high probability that an incorrect temporal context is created for a higher temporal layer in which a distance between the input image and the reference image is long. According to an embodiment, by smoothing the temporal context differently for temporal layers, the incorrect temporal context may be regulated, thereby achieving higher coding performance compared to common technology.

Figure 6A:
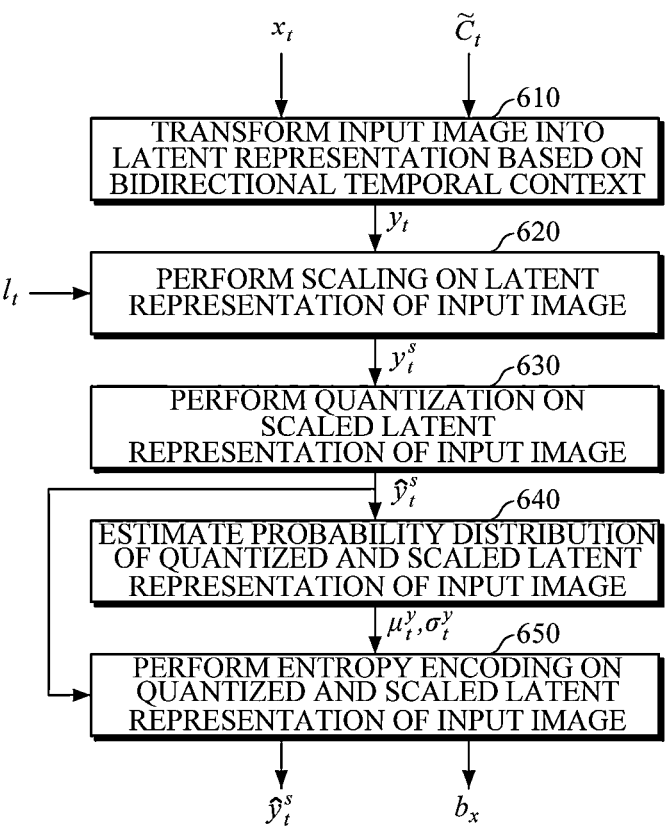
FIG. 6A is a flowchart illustrating an operation of encoding an input image according to an embodiment of the disclosure.
Figure 6B:
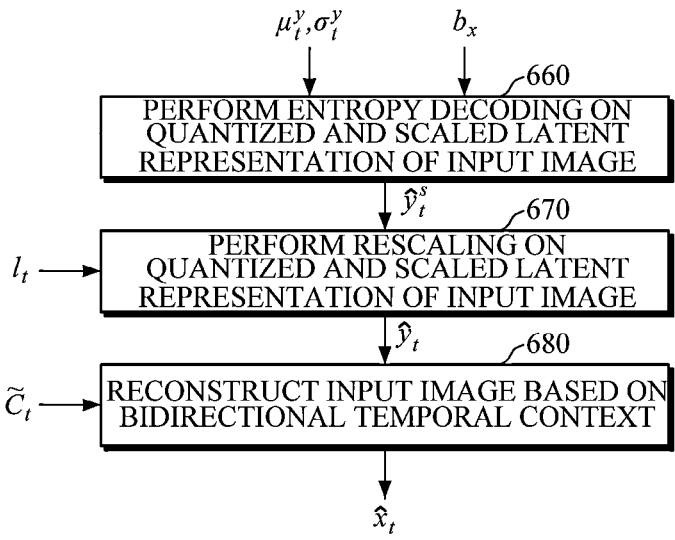
FIG. 6B is a flowchart illustrating an operation of decoding an input image according to an embodiment of the disclosure.

FIGS. 6A and 6B are flowcharts illustrating operation 600 of encoding and/or decoding an input image according to an embodiment of the disclosure.

Referring to FIG. 6A, according to an embodiment, in operation 610, the method may include transforming input image into latent representation based on bidirectional temporal context. For example, by using an input image $x_t$ and the smoothed bidirectional temporal context $\tilde{C}_t$ as input, the video encoding device may transform the input image $x_t$ into a latent representation $y_t$ and output the latent representation. A Convolutional Neural Network may be used, and the smoothed bidirectional temporal context may be used instead of using a temporal context created from a unidirectional reference image.

According to an embodiment, in operation 620, the method may include performing scaling on latent representation of input image. For example, by using, as input, the temporal layer $l_t$ of the input image and the latent representation $y_t$ of the input image, the video compression apparatus may perform scaling on the latent representation $y_t$ of the input image according to the temporal layers, and may output the scaled latent representation $$y_t^s$$

of the input image. As illustrated in operation 230, the scaling may be performed by dividing the latent representation $y_t$ of the input image into quantization step determining parameters defined for the temporal layers.

According to an embodiment, in operation 630, the method may include performing quantization on scaled latent representation of input image. For example, the video compression apparatus may perform quantization on the scaled latent representation $$y_t^s$$

of the input image and output the quantized and scaled latent representation $$\hat{y}_t^s$$

of the input image. The quantization may be performed using uniform quantization, i.e., a typical rounding operation, but is not limited thereto.

According to an embodiment, in operation 640, the method may include estimating probability distribution of quantized and scaled latent representation of input image. For example, by using the quantized and scaled latent representation $$\hat{y}_t^s$$

f the input image as input, the video compression apparatus may estimate a probability distribution of the latent representation $$\hat{y}_t^s$$

for entropy encoding the latent representation $$\hat{y}_t^s.$$

In this case, an entropy model may be used, and based on the assumption that the latent representation follows the distribution such as Laplacian distribution or Gaussian distribution, etc., the entropy model may output a mean $$\mu_t^y$$

and a standard deviation $$\sigma_t^y$$

f the distribution.

According to an embodiment, in operation 650, the method may include performing entropy encoding on quantized and scaled latent representation of input image. For example, by using, as input, the quantized and scaled latent representation $$\hat{y}_t^s$$

of the input image and the mean $$\mu_t^y$$

and the standard deviation $$\sigma_t^y,$$

the video compression apparatus may perform entropy encoding on the latent representation $$\hat{y}_t^s$$

to output a bitstream $b_x$. The entropy encoding may be arithmetic encoding.

Referring to FIG. 6B, a process may be performed based on a result of the entropy encoding in operation 650.

According to an embodiment, in operation 660, the method may include performing entropy decoding on quantized and scaled latent representation of input image. For example, by using, as input, the entropy-encoded bitstream $b_x$ and the mean $$\mu_t^y$$

and the standard deviation $$\sigma_t^y$$

which are used in the entropy encoding process, the video compression apparatus may perform entropy decoding to reconstruct the latent representation $$\hat{y}_t^s.$$

The entropy encoding process in operation 650 is generally lossless encoding, such that the latent representation $$\hat{y}_t^s$$

reconstructed in operation 660 may be the same as the latent representation $$\hat{y}_t^s$$

which is an input of the entropy encoding. The entropy decoding may be arithmetic decoding, but is not limited thereto.

According to an embodiment, in operation 670, the method may include performing rescaling operation on quantized and scaled latent representation of input image. For example, by using, as input, the temporal layer $l_t$ of the input image and the quantized and scaled latent representation $$\hat{y}_t^s$$

of the input image, the video compression apparatus may perform rescaling to return the scaled latent representation of the input image to an original scale, to output the rescaled latent representation $\hat{y}_t$ of the input image. The rescaling may be performed in the same manner as the above operation 270.

According to an embodiment, in operation 680, the method may include reconstructing input image based on bidirectional temporal context. For example, by using, as input, the rescaled latent representation $\hat{y}_t$ of the input image and the smoothed bidirectional temporal context $\tilde{C}_t$, the video compression apparatus may reconstruct and output the input image $\hat{x}_r$. In this case, a Convolutional Neural Network may be used, and the smoothed bidirectional temporal context may be used instead of using a temporal context created from a unidirectional reference image. The reconstructed image may be used as a reference image for subsequent images.

Figure 7:
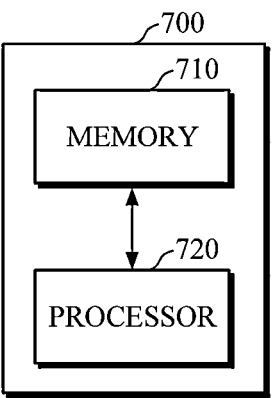
FIG. 7 is a block diagram illustrating an electronic device according to an embodiment of the disclosure.

FIG. 7 is a block diagram illustrating an electronic device according to an embodiment of the disclosure.

Referring to FIG. 7, the electronic device 700 includes a memory 710 and a processor 720.

According to an embodiment, the electronic device 700 may include a video encoding device based on neural network or a video decoding device based on neural network which is configured to perform various examples of the above method for video encoding or video decoding. According to an embodiment, the electronic device 700 may be a device configured to perform both video encoding and video decoding. The electronic device may include, but is not limited to, a device such as an edge device which requires applications such as video encoding in an environment with limited computing resources, various image transmission/reception devices, such as mobile phones, TV, monitors, Internet of Things (IoT) devices, as well as cloud computing devices, and the like.

The memory 710 may store various instructions for image processing, such as video encoding, encoding, etc., and data associated with image processing (neural network, weight, quantization step determining parameter, reference image, reconstructed image, bitstream generated by encoding, etc.). The memory 710 may include Random Access Memory (RAM), such as Dynamic Random Access Memory (DRAM), Static Random Access Memory (SRAM), etc., Read-Only Memory (ROM), flash memory, cache memory, virtual memory, etc., but is not limited thereto.

The processor 720 may execute the instructions stored in the memory 710 and perform various video processing operations by referring to various data stored in the memory 710. The instructions may include one or more instructions configured to perform various embodiments of the aforementioned method for video encoding. For example, the instructions may include creating a bidirectional temporal context of the input image by using, as input, the input image, bidirectional reference images, and temporal layers of the input image, smoothing the bidirectional temporal context by using the bidirectional temporal context and the temporal layer as input, and encoding and decoding the input image by using the smoothed bidirectional temporal context and the input image as input.

The processor 720 according to one or more embodiments may perform an overall control operation of the electronic device 700.

The processor 720 may include at least one from among a central processing unit (CPU), a graphics processing unit (GPU), an accelerated processing unit (APU), a many integrated core (MIC), a digital signal processor (DSP), a neural processing unit (NPU), an hardware accelerator or a machine learning accelerator. The processor 720 may execute at least one program or instruction stored in a memory. For example, the processor 720 may perform a method according to one or more embodiments by executing at least one instruction stored in the memory.

According to one or more embodiments of the disclosure, one or more operations may be performed by one processor, or performed by a plurality of processors. For example, when a first operation, a second operation, and a third operation are performed by the method according to one or more more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor). According to an embodiment, at least one of the first, second and third processor may be external to the terminal 200.

The processor 720 may be realized as a single core processor that includes one core, or may be realized as at least one multicore processor that includes a plurality of cores (e.g., a homogeneous multicore or a heterogeneous multicore). In a case in which the processor 720 is realized as a multicore processor, the plurality of cores included in the multicore processor may respectively include a memory inside the processor such as a cache memory and an on-chip memory, and a common cache shared by the plurality of cores may be included in the multicore processor.

According to one or more embodiments of the disclosure, the processor may refer to a system on chip (SoC), a single core processor, a multicore processor, or a core included in the single core processor or the multicore processor on which at least one processor and other electronic components are integrated, and the core described herein may be realized as the CPU, the GPU, the APU, the MIC, the DSP, the NPU, the hardware accelerator, the machine learning accelerator, or the like, but the embodiments of the disclosure are not limited thereto.

FIGS. 8A to 8I are diagrams explaining the video encoding and/or decoding process in detail according to an embodiment of the disclosure. FIG. 9A is a diagram illustrating an example of a context fusion network. FIG. 9B is a diagram illustrating an example of an entropy model for estimating a probability distribution.

Figure 8A:
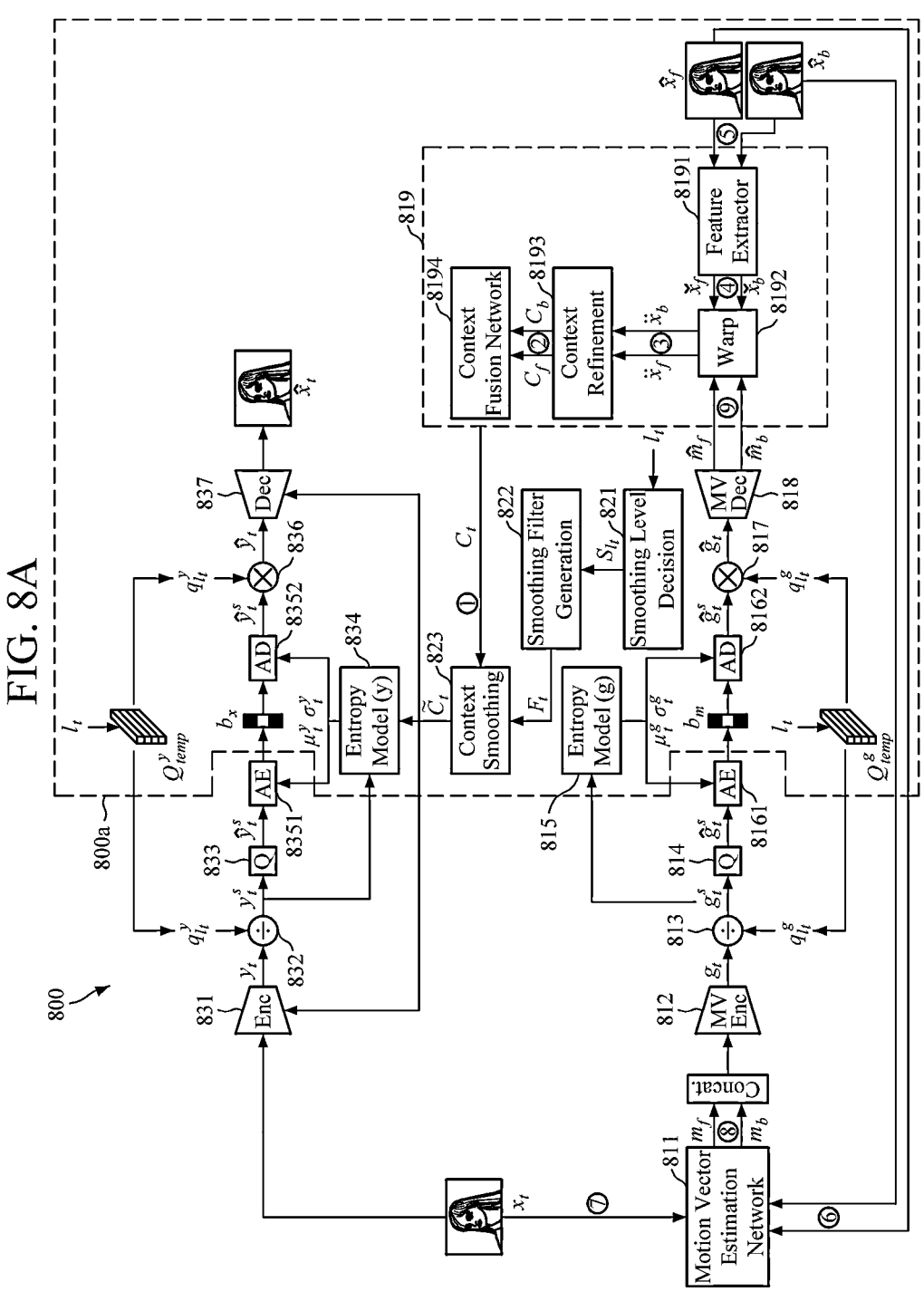
FIGS. 8A to 8I are diagrams explaining the video encoding process in detail according to an embodiment of the disclosure.
Figure 8B:
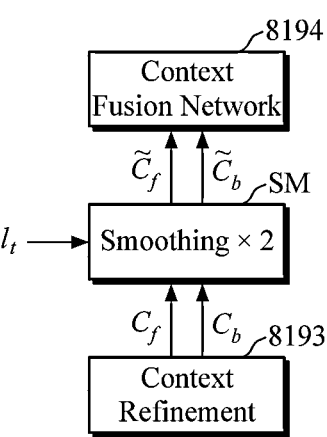
Figure 8C:
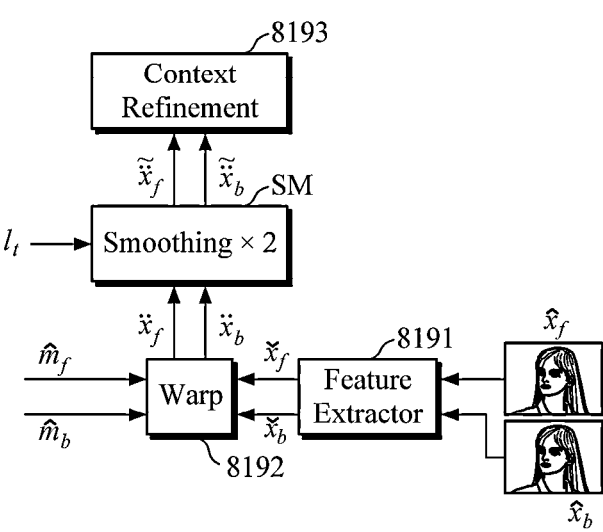
Figure 8D:
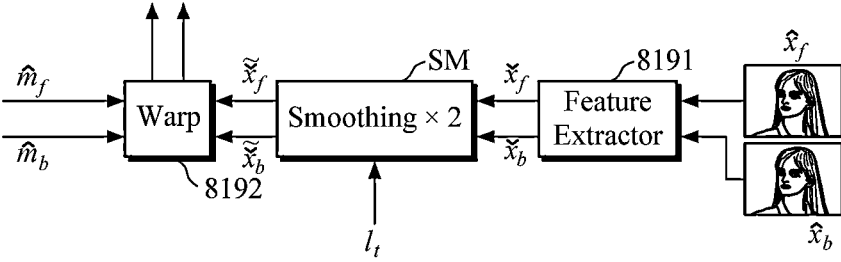
Figure 8E:
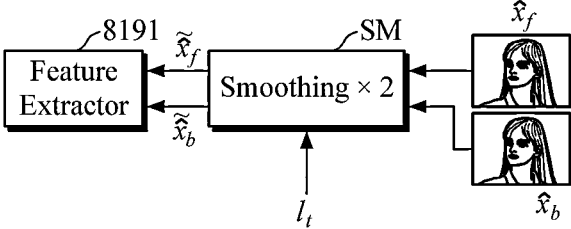
Figure 8F:
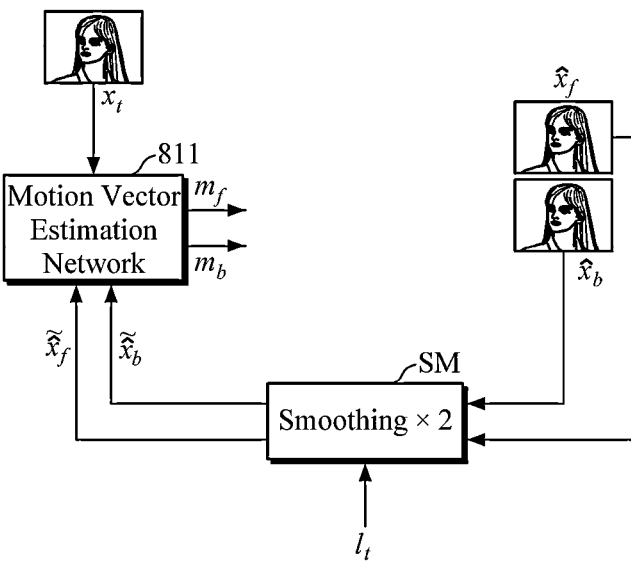
Figure 8G:
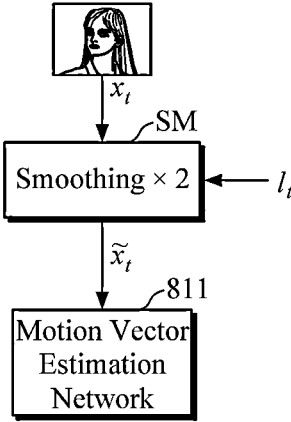
Figure 8H:
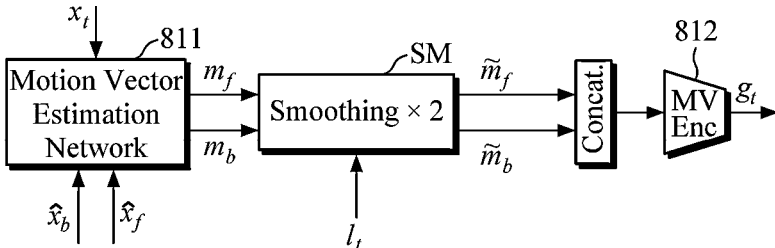
Figure 8I:
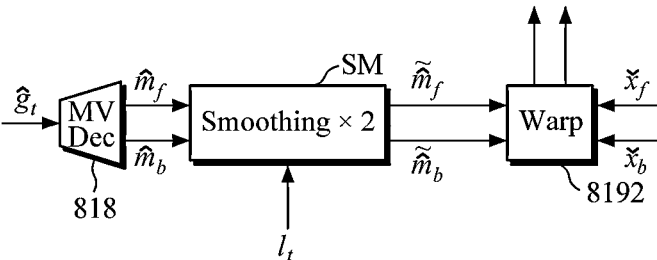
Figure 9A:
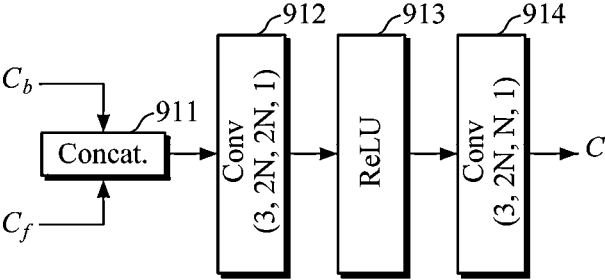
FIG. 9A is a diagram illustrating an example of a context fusion network.
Figure 9B:
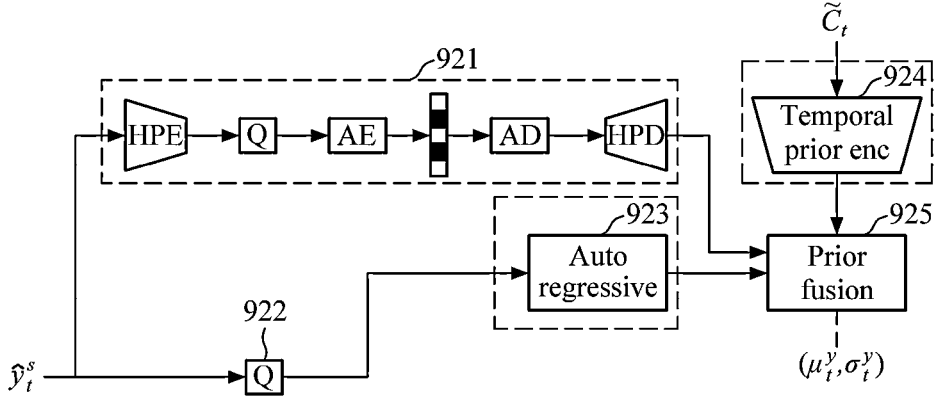
FIG. 9B is a diagram illustrating an example of an entropy model for estimating a probability distribution.

Referring to FIG. 8A, the overall video encoding operation performed by the electronic device 700 will be described below. The electronic device 700 may include a video encoding device 800 and/or a video decoding device 800a. As illustrated herein, the video encoding device 800 and/or a video decoding device 800a may share components to use bidirectional prediction and temporal layer information. The video decoding device 800a may be provided as a separate hardware chip and/or software from the video encoding device 800.

The video encoding device 800 may input an input image $x_t$ and bidirectional reference images $\hat{x}_f$ and $\hat{x}_b$ to a single motion vector estimation network 811, and may estimate a motion vector $m_f$ between a forward reference image $\hat{x}_f$ and the input image $x_t$, and a motion vector $m_b$ between a backward reference image $\hat{x}_b$ and the input image $x_t$. In this case, various optical flow estimation neural networks may be used as the motion vector estimation network.

Then, in order to transform the two motion vectors $m_f$ and $m_b$, output from the motion vector estimation network 811, into a latent representation $g_t$ of one bidirectional motion vector, the two motion vectors are concatenated, and a result of the concatenation may be input to a motion vector encoder (MV Enc) 812. The MV Enc may be based on a convolutional neural network and uses bidirectional motion vectors as input, such that the number of channels of the convolution layer may be doubled.

Subsequently, a quantization step parameter $q_{i_t}^g$ is selected from a quantization step parameter set $$Q_{temp}^g$$

according to the temporal layer $l_t$ of the input image, and by dividing the latent representation $g_t$ of the bidirectional motion vectors, output from the MV Enc 812, by the selected quantization step parameter in 813, the latent representation of the bidirectional motion vectors may be scaled according to the temporal layer.

Next, the scaled latent representation $$\hat{g}_t^s$$

of the bidirectional motion vectors is quantized in 814, and a probability distribution of the quantized and scaled latent representation $$\hat{g}_t^s$$

of the bidirectional motion vectors may be estimated using an entropy model 815. The entropy model may be an entropy model using hyperprior and autoregressive context and the like, but is not limited thereto.

By using the probability distribution estimated by the entropy model 815, for example, a mean $$\mu_t^g$$

and a standard deviation $$\sigma_t^g,$$

the quantized and scaled latent representation $$\hat{g}_t^s$$

of the bidirectional motion vectors are encoded in AE 8161 and decoded in AD 8162. As a result of the encoding, a bitstream $b_m$ for the latent representation of the bidirectional motion vectors is output, and decoding is performed using the bitstream $b_m$ and the probability distribution.

Then, a quantization step parameter $$q_{l_t}^g$$

is selected from a quantization step parameter set $$Q_{temp}^g$$

by using the temporal layer $l_t$ of the input image, and rescaling according to the temporal layer may be performed by multiplying the selected quantization step parameter by the quantized and scaled latent representation of the bidirectional motion vectors in 817.

Subsequently, the rescaled latent representation $\hat{g}_t$ of the bidirectional motion vectors is input to a motion vector decoder (MV Decoder) in 818, and a forward motion vector $\hat{m}_f$ and a backward motion vector $\hat{m}_b$ may be reconstructed. In this case, the MV Decoder is based on a convolutional neural network, and the number of channels of the convolution layer is doubled in order to reconstruct all the bidirectional motion vectors. In addition, in order to perform smoothing differently depending on spatial positions, the MV Decoder may increase the number of channels and output smoothing information associated with spatial positions.

Next, by using, as input, the reconstructed bidirectional motion vectors $\hat{m}_f, \hat{m}_b$ and the bidirectional reference images $\hat{x}_f, \hat{x}_b$, a bidirectional temporal context $C_t$ is output in 819.

For example, the respective bidirectional reference images are input to the feature extractor 8191 to output a forward reference feature map $\check{x}_f$ and a backward reference feature map $\check{x}_b$. In this case, the feature extractor 8191 may be a convolutional neural network. Subsequently, based on the forward motion vector $\hat{m}_f$, typical bilinear warping 8192 is performed on the forward reference feature map $\check{x}_f$, to output a warped forward reference feature map $\ddot{x}_f$. Likewise, warping may be performed on the backward motion vector $\hat{m}_b$, and the backward reference feature map $\check{x}_b$ to output a warped backward reference feature map $\ddot{x}_b$. The warped forward reference feature map and the warped backward reference feature map may pass through context refinement 8193 for post-processing, and may be output as a forward temporal context $C_f$ and a backward temporal context $C_b$. In this case, the neural network for post-processing may be a convolutional neural network. Lastly, the forward temporal context $C_f$ and the backward temporal context $C_b$ are input to a Context Fusion Network 8194 to output a bidirectional temporal context $C_t$.

Referring to FIG. 9A, the Context Fusion Network 8194 may include concatenation 911, convolution layers 912 and 914, and a nonlinear layer such as ReLU (e.g., LeakyReLU) 913. In the convolution layers Conv (k, $C_{in}$, $C_{out}$, s) 912 and 914, k denotes horizontal and vertical sizes of the kernel, $C_{in}$ denotes the number of input channels, $C_{out}$ denotes the number of output channels, and s denotes the stride of the convolution. In FIG. 9A, N denotes the number of channels in the forward temporal context and bidirectional temporal context.

Referring back to FIG. 8A, smoothing may be performed by using the temporal layer $l_t$ of the input image as input. By using the temporal layer $l_t$ of the input image as input, a smoothing level $s_t$ for generating a smoothing filter may be output in 821.

As a smoothing method, the Gaussian smoothing or bilateral filter based on a Gaussian kernel may be used, in which case a standard deviation for generating a smoothing filter may be output. In this case, in order to use a greater level of smoothing for a higher temporal layer, a monotonically decreasing smoothing level, such as $s_1=10$, $s_2=5$, and $s_3=2.5$ may be used for the temporal layer $l_t$. A spatial position difference may be considered by Gaussian smoothing, and the bilateral filter may be used to consider not only the spatial position difference but also a difference in values input to a smoothing object.

Then, a smoothing filter for use in smoothing the bidirectional temporal context may be generated in 822. Assuming that Gaussian smoothing is performed, the smoothing filter may be generated by using a smoothing level $s_t$ according to the temporal layer, i.e., a standard deviation as input. By defining the smoothing level as $s_t$, and Gaussian kernel size as K×K, the value of K may be calculated as in, for example, Equation 4.

$$K = 2 \times \lceil 3 \times s_{l_t} \rceil + 1 \qquad \text{[Equation 4]}$$

Herein, $\lceil . \rceil$ denotes a typical rounding operation.

In an example case in which the value of K is given, a Gaussian kernel $F_t$ based on the given smoothing level $s_t$ may be calculated as in Equation 5. In this Equation, $(k_x, k_y)$ denotes a spatial position of the kernel.

$$F_t[k_x][k_y] = \frac{\exp\left(-\frac{(k_x)^2 + (k_y)^2}{2(s_{l_t})^2}\right)}{\sum_{\forall k_x}\sum_{\forall k_y}\exp\left(-\frac{(k_x)^2 + (k_y)^2}{2(s_{l_t})^2}\right)} \qquad \text{[Equation 5]}$$

$$k_x, k_y \in \left\{-\frac{K-1}{2}, \frac{K-3}{2}, \dots, 0, \dots, \frac{K-3}{2}, \frac{K-1}{2}\right\}$$

Then, by using the bidirectional temporal context $C_t$ and the smoothing filter, e.g., Gaussian kernel, as input, the smoothed bidirectional temporal context $\ddot{C}_t$ is output in 823. In this case, a kernel with stride one may be multiplied for each spatial position of the bidirectional temporal context $C_t$.

Subsequently, by using, as input, the smoothed bidirectional temporal context $\tilde{C}_t$ and the input image $x_t$, a latent representation $y_t$ of the input image may be output by inter-channel concatenation and contextual encoder (Enc) 831.

Next, by using the temporal layer $l_t$ of the input image as input, a quantization step parameter $$q_{l_t}^y$$

may be selected from a quantization step parameter set $$Q_{temp}^y.$$

By dividing the latent representation $y_t$ of the input image by the selected quantization step parameter in 832, the latent representation of the bidirectional motion vectors may be scaled according to the temporal layer.

Then, the scaled latent representation of the bidirectional motion vectors is quantized in 833, and a probability distribution, i.e., a mean $$\mu_t^y$$

and a standard deviation $$\sigma_t^y,$$

24 of the quantized and scaled latent representation $$\hat{y}_t^s$$

of the input image may be estimated by using an entropy model 834.

Referring to FIG. 9B, the entropy model 834 may include a common hyperprior model 921, an autoregressive context model 923, a temporal prior encoder 924, and a prior fusion network 925. The quantized and scaled latent representation $$\hat{y}_t^s$$

of the input image is input to the hyperprior model 921 and the autoregressive context model 923, to output hyperprior information and autoregressive context, respectively. In addition, the temporal prior encoder 924 may extract temporal prior information by using the smoothed bidirectional temporal context $\tilde{C}_t$ as input. The prior fusion network 925 may output the mean $$\mu_t^y$$

and the standard deviation $$\sigma_t^y$$

of the quantized and scaled latent representation $$\hat{y}_t^s$$

of the input image, by using the temporal prior information, the hyperprior information, and the autoregressive context as input.

Referring back to FIG. 8A, by using the mean $$\mu_t^y$$

and the standard deviation $$\sigma_t^y$$

which are estimated by the entropy model 834, the quantized and scaled latent representation $$\hat{y}_t^s$$

of the input image is decoded in 8351, and a bitstream $b_x$ of the input image is output as a result.

Then, decoding is performed in 8352 by using the output bitstream $b_x$ and the mean $$\mu_t^y$$

and the standard deviation $$\sigma_t^y,$$

followed by rescaling according to the temporal layer by multiplying the quantization step parameter $$q_{l_t}^y$$

according to the temporal layer $l_t$ of the input image by the quantized and scaled latent representation of the input image in 836, and then the smoothed bidirectional temporal context $\tilde{C}_t$ and the input image $x_t$ are input to the contextual decoder 837 to output a reconstructed image $\hat{x}_t$ of the input image.

The reconstructed image $\hat{x}_t$ is stored in the memory to be used as a reference image for encoding of subsequent input images.

As described above, smoothing according to the temporal layer may be performed on the bidirectional temporal context $C_t$ in 821, 822, and 823, but may also be performed similarly at various other smoothing positions.

In FIG. 8A, ①, ②, ③, ④, ⑤, ⑥, ⑦, ⑧, ⑨ indicate various smoothing positions. In an example case in which smoothing is performed, Smoothing objects at each position are shown in Table 1 below. In an example case in which there are two smoothing objects, as indicated in the "Remark" column of the table, smoothing may be performed on each of the smoothing objects, or smoothing may be performed by concatenating the two objects into one.

FIGS. 8B to 8I are diagrams illustrating an example of performing smoothing at smoothing positions of ② to ⑨. As illustrated herein, smoothing is performed by inputting the temporal layer 4 and the smoothing objects to a smoothing module SM. In an example case in which the smoothing position is ⑧ of FIG. 8A, the smoothing objects are bidirectional motion vectors $m_f$, $m_b$, which are outputs of the motion vector estimation network 811, and smoothing is performed on each of the bidirectional motion vectors $m_f$, $m_b$ by using the smoothing module SM, to obtain the smoothed bidirectional motion vectors $\tilde{m}_f$, $\tilde{m}_b$.

TABLE 1

| Smoothing position | Smoothing object | Remark |
|---|---|---|
| ① of FIG. 8A | Output $c_t$ of 8194 | Perform smoothing on $c_t$ |
| ② of FIG. 8A | Outputs $c_f$, $c_b$ of 8193 | Perform smoothing on each of $c_f$, $c_b$ |
| ③ of FIG. 8A | Outputs $\ddot{x}_f$, $\ddot{x}_b$ of 8192 | Perform smoothing on each of $\ddot{x}_f$, $\ddot{x}_b$ |
| ④ of FIG. 8A | Outputs $\check{x}_f$, $\check{x}_b$ of 8191 | Perform smoothing on each of $\check{x}_f$, $\check{x}_b$ |
| ⑤ of FIG. 8A | Inputs $\hat{x}_f$, $\hat{x}_b$ of 8191 | Perform smoothing on each of $\hat{x}_f$, $\hat{x}_b$ |
| ⑥ of FIG. 8A | Inputs $\hat{x}_f$, $\hat{x}_b$ of 811 | Perform smoothing on each of $\hat{x}_f$, $\hat{x}_b$ |
| ⑦ of FIG. 8A | Input $x_t$ of 811 | Perform smoothing on $x_t$ |
| ⑧ of FIG. 8A | Outputs $m_f$, $m_b$ of 811 | Perform smoothing on each of $m_f$, $m_b$ |
| ⑨ of FIG. 8A | Outputs $\tilde{m}_f$, $\tilde{m}_b$ of 818 | Perform smoothing on each of $\tilde{m}_f$, $\tilde{m}_b$ |

Referring back to FIG. 8A, the video decoding device 800*a*, which is a neural network-based device, may reconstruct the motion vectors and create a bidirectional temporal context by using the bitstream $b_m$ for the latent representation of the bidirectional motion vectors generated by the video decoding device 800*a* and the bidirectional reference images, and may reconstruct the input image by using the bitstream $b_x$ for the input image and the bidirectional temporal context. In this case, rescaling and/or smoothing may be performed on the latent representation by using the temporal layer. The video encoding device is described in detail above, such that a redundant description thereof will be omitted.

Figure 10:
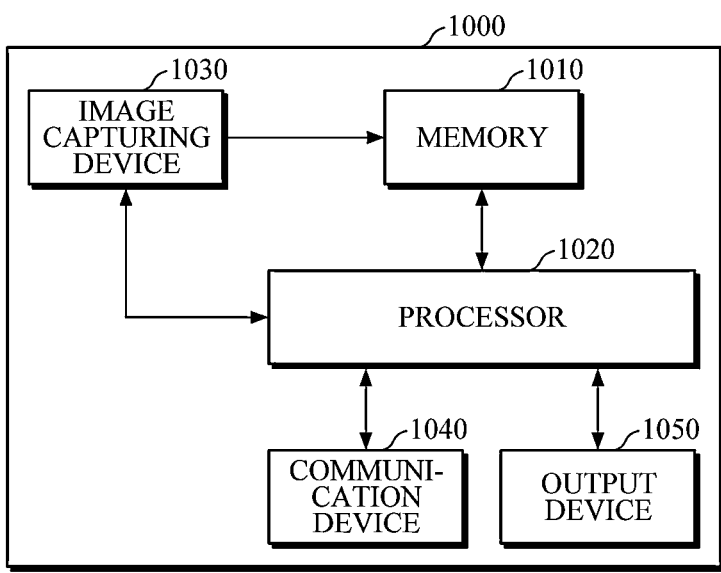
FIG. 10 is a block diagram illustrating an electronic device according to another embodiment of the disclosure.

FIG. 10 is a block diagram illustrating an electronic device according to another embodiment of the disclosure.

Referring to FIG. 10, an electronic device 1000 may include a memory 100, a processor 1020, an image capturing device 1030, a communication device 1040, and an output device 1050. The memory 100 and the processor 1020 are described in detail above, such that a description thereof will be omitted.

The image capturing device 1030 may include a device, such as a camera and the like, for capturing still images or moving images, etc., and may store the captured images in the memory 1030 and transmit the images to the processor 1020. The image capturing device 1030 may include a lens assembly having one or more lenses, image sensors, a charge-coupled device (CCD sensor), image signal processors, and/or flashes. The lens assembly included in a camera module may collect light emanating from a subject to be imaged.

The communication device 1040 may support establishment of a direct communication channel and/or a wireless communication channel between the electronic device 1000 and another electronic device, a server, or the sensor device within a network environment, and performing of communication via the established communication channel, by using various communication techniques. For example, the direct communication channel may be a wired communication between the electronic device 1000 and another electronic device. The communication device 1040 may transmit the images captured by the image capturing device 1030, and/or the data (e.g., encoded video, etc.) processed by the processor 1020 to another electronic device. In addition, the communication device 1040 may receive a video to be processed from a cloud device or another electronic device, may store the received video in the memory 100, and may transmit the video to the processor 1020 so that the processor 1020 may process the video.

The output device 1050 may visually/non-visually output the images captured by the image capturing device 1030, and/or data processed by the processor 1020. The output device 1050 may include a sound output device, a display device (e.g., display), an audio module, and/or a haptic module. The output device 1050 may display a video processed by the processor 1020 and the like on the display, thereby improving user's video experience.

In addition, the electronic device 1000 may further include a sensor device (e.g., acceleration sensor, gyroscope, magnetic field sensor, proximity sensor, illuminance sensor, fingerprint sensor, etc.) configured to detect various data, an input device (e.g., a microphone, a mouse, a keyboard, and/or a digital pen (e.g., a stylus pen, etc.), etc.) configured to receive instructions and/or data to be used from a user, and the like.

One or more embodiments of the disclosure described above can be realized as a computer-readable code written on a computer-readable recording medium. The computer-readable recording medium may be any type of recording device in which data is stored in a computer-readable manner. For example, the method of encoding and/or decoding an image as illustrated according to various embodiments described above may be can be realized as a computer-readable code, which may be executed on one or more processors. Although the figures illustrate the operations of the methods in a particular according to one or more embodiments of the disclosure, the disclosure is not limited thereto, and as such, the order of operations may vary, one or more operations may be added, or one or more operations may be omitted according to various other embodiments.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily inferred by programmers of ordinary skill in the art to which the invention pertains.

The disclosure has been described herein with regard to preferred embodiments. However, it will be obvious to those skilled in the art that various changes and modifications can be made without changing technical conception and features of the disclosure. Thus, it is clear that the above-described embodiments are illustrative in all aspects and are not intended to limit the disclosure.

What is claimed is:

1. A method for neural network-based video encoding, the method comprising:

estimating a motion vector between an input image and a reference image based on a temporal layer of the input image;

transforming the motion vector into a latent representation;

scaling the latent representation of the motion vector based on the temporal layer of the input image; and obtaining a temporal context of the input image based on the scaled latent representation of the motion vector and the reference image.

2. The method of claim 1, wherein the reference image comprises a first bidirectional reference image temporally before the input image and a second bidirectional reference image temporally after the input image.

3. The method of claim 1, wherein the scaling based on the temporal layer comprises scaling the latent representation of the motion vector by dividing the latent representation of the motion vector into quantization step determining parameters defined for the temporal layer.

4. The method of claim 1, further comprising:

performing entropy encoding and entropy decoding on the latent representation of the motion vector;

rescaling the scaled latent representation of the motion vector based on the temporal layer; and reconstructing motion vectors based on the rescaled latent representation of the motion vector, wherein the obtaining of the temporal context comprises obtaining the temporal context based on the reconstructed motion vectors and the reference image.

5. The method of claim 4, wherein the rescaling based on the temporal layer comprises multiplying the scaled latent representation of the motion vector by the quantization step determining parameters defined for the temporal layer.

6. The method of claim 4, wherein the obtaining of the temporal context comprises:

outputting a reference feature map by inputting the reference image into a feature extraction neural network, performing bilinear warping on the reference feature map based on the reconstructed motion vectors to output a warped reference feature map, inputting the warped reference feature map to a post-processing neural network, and inputting an output of the post-processing neural network to a context fusion network to output the temporal context.

7. A method for neural network-based video encoding, the method comprising:

estimating a motion vector between an input image and a reference image based on a temporal layer of the input image;

transforming the motion vector into a latent representation;

obtaining a temporal context of the input image based on the latent representation of the motion vector and the reference image; and performing a smoothing operation on the temporal context based on a smoothing object comprising at least one of the reference image, the input image, the motion vector, an input in the obtaining of the temporal context, an output in the obtaining of the temporal context, or an input or output of a sub-process in the obtaining of the temporal context.

8. The method of claim 7, wherein the reference image comprises a first bidirectional reference image temporally before the input image and a second bidirectional reference image temporally after the input image.

9. An electronic device comprising:

a memory configured to store one or more instructions and a reference image; and a processor configured to execute the one or more instructions to: estimate a motion vector between an input image and the reference image based on the reference image, the input image, and a temporal layer of the input image;

transform the motion vector into a latent representation;

scale the latent representation of the motion vector based on the temporal layer of the input image; and obtain a temporal context of the input image based on the scaled latent representation of the motion vector and the reference image.

* * * * *